United States Patent
Magram

[11] 3,728,800
[45] Apr. 24, 1973

[54] EDUCATIONAL APPARATUS

[76] Inventor: David Magram, 2304 Sherwood St., Pittsburgh, Pa. 15217

[22] Filed: Sept. 15, 1971

[21] Appl. No.: 180,659

[52] U.S. Cl. ..................................................35/35 J
[51] Int. Cl. ................................................G09b 1/36
[58] Field of Search .....................35/35 J, 31 H, 70, 35/71, 72, 73, 69; 273/152.7 R, 156 A, 157

[56] References Cited

UNITED STATES PATENTS

| | | | |
|---|---|---|---|
| 3,333,351 | 8/1967 | Williams | 35/35 J |
| 2,987,833 | 6/1961 | Stolpen | 35/71 |
| 2,510,884 | 6/1950 | Greene | 273/157 R X |

FOREIGN PATENTS OR APPLICATIONS 1,168,727  9/1958  France.................................35/18 A Primary Examiner—Wm. H. Grieb
Attorney—Arland T. Stein, Thomas C. Wettach and Robert D. Yeager

[57] ABSTRACT

An educational apparatus comprising a plurality of blocks, each side of which includes a grammatical part of speech and the ends of which are designed to interlock with respective blocks to form a grammatically correct sentence.

5 Claims, 17 Drawing Figures

Patented April 24, 1973 3,728,800

INVENTOR.
David Magram

Patented April 24, 1973  3,728,800

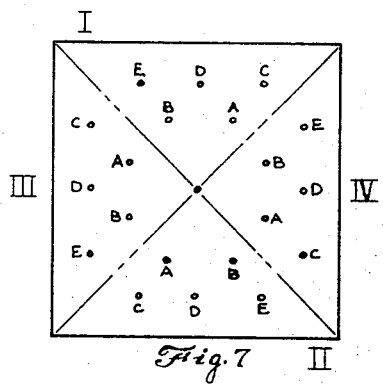

Fig. 7

| | BE | BE | AC(D) BE | AC(E) BE | AB(E) |
|---|---|---|---|---|---|
| Then | She | I | | The | |
| Today | We | | We | Many | |
| Tomorrow | He | I | | A | |
| Later | They | | You | Some | |

Fig. 8     Fig. 9

| AB(E) | AB(E) | AB(E) | AC(D) | AB(D) | AB(D) | AB(D) | CE |
|---|---|---|---|---|---|---|---|
| tall | | boy | | big | | church. | |
| short | | boys | | old | | stores | |
| young | | girls | | small | | school | |
| nice | | girls | | new | | houses | |

Fig. 10

| AC(D) | BC(E) | AC(E) | BC(E) | AC(E) | AD | AC(D) | AD | AC(D) | BD(E) | AC(E) | BD(E) | AC(D) | CD | AC(E) | CD |
|---|---|---|---|---|---|---|---|---|---|---|---|---|---|---|---|
| sees | see | had | had | was | was | did | did |
| see | see | had | had | were | were | do | do |
| saw | saw | have | has | is | am | does | do |
| saw | saw | have | have | are | are | did | did |

Fig. 11

| AC | AE(C) AC | CD(E) |
|---|---|---|
| went | should | |
| ran | will | |
| came | would | |
| walked | might | |

| AD | AD | AD | AE(C) AD | BD | AD | BC(E) |
|---|---|---|---|---|---|---|
| not | gone | been | seen |
| not | ran | been | seen |
| not | come | been | seen |
| not | walked | been | seen |

Fig. 12

INVENTOR.
David Magram

Fig. 13

| BD(E) | BD | BD | AB(C) BD | AE(D) BD | BC(E) BD | BD(E) BD(E) | BC(D) BD |
|---|---|---|---|---|---|---|---|
| not | going | able | near | really | seen | here. |
| not | running | ready | beside | still | seen | happy. |
| not | coming | planning | on | almost | seen | there. |
| not | walking | going | under | already | seen | sad. |

Fig. 14

| AE(C) | AE(C) | BC(E) AE(D) |
|---|---|---|
| there. | from | to |
| fast. | to | to |
| here. | from | to |
| slowly. | to | to |

Fig. 15

| CD(E) BC(E) | AB(D) BC(D) | BC(E) BC(E) |
|---|---|---|
| this | by | her. |
| those | by | us. |
| that | by | me. |
| these | by | them. |

Fig. 16

| CE | BE |
|---|---|
| if | |
| when | |
| because | |
| and | |

Fig. 17

| CD | AE(C) CD | BC(E) CD | CD CD(E) | AD CD(E) | BD |
|---|---|---|---|---|---|
| go | see | not | have | be |
| run | see | not | have | be |
| come | see | not | have | be |
| walk | see | not | have | be |

INVENTOR

David Magram

EDUCATIONAL APPARATUS

My invention relates to an educational apparatus and in particular, an apparatus designed to teach children and others grammatical construction of sentences. The conventional method of teaching language, which is analytical, has not been particularly successful with young children, particularly deaf children or those with neurological impairments, foreign students, etc. These children often require special assistance in learning the language patterns and the traditional techniques are rarely satisfactory for the understanding of the generative function of language.

To overcome the difficulties inherent in the learning of the English language, various synthetic and creative devices have been attempted. Some of these devices include the use of blocks. See for example U.S. Pat. Nos. 3,235,976, 1,542,031, 2,386,114, 557,307, 341,754, 2,310,800, 2,520,649, 2,987,833. Other devices included cards e.g. U.S. Pat. Nos. 3,482,333, 3,333,351 and 1,428,456 and see U.S. Pat. No. 3,389,480.

For the most part these devices rely upon codes such as cooperating or matching numbers or coordinating similar colors to aid the student in arriving at a desired end. Thus by following a key picture or preprogrammed arrangement of numbers or colors, a student can arrive at a preselected word or sentence. One of the problems inherent in this type of device is that the student cannot, or only with great difficulty, discover new word forms or combinations. The student is precluded from experimenting with words to generate new sentences and at the same time know if he is right or wrong. Many of the prior art devices assume some knowledge of language structure.

I provide a teaching device which overcomes many of the problems inherent in the devices of the prior art. I provide a plurality of blocks having a word on each of the sides. The ends of the blocks are designed to interlock only with a block which provides a word that is grammatically correct. By interlocking the various blocks the words are arranged to produce a grammatically correct sentence. I provide a teaching device wherein it is impossible to construct a grammatically incorrect sentence because of the nature of the interlocking members. Thus, I provide a device in which a child is readily able to construct sentences without learning a complicated number, letter, or color code prior to utilizing or taking advantage of the device. I further provide a means for understanding the generative function of language which was not heretofore possible with the devices of the prior art and which does not assume any knowledge on the part of the user.

I place the information or words on blocks including both the singular and plural forms. By reason of the nature of my interlocking linkages, these forms are separated while retaining the same word classification. Blocks or cards that lack this linkage function treat language as a set of stable elements wherein reality language is contextual or linking in nature; it is a dynamic rather than a static medium.

In one embodiment, I provide a plurality of blocks which are particularly useful to younger children. These blocks include "shaped-link" projections and complementarily shaped receiving grooves. The shaped linkages can be used in combination with pictorial coding or color coding to aid in the identification of the linkages. As an incidental benefit to the younger children, the shape and color coding sharpens the mental dexterity relating to the identification and recognition of various similar shapes and colors.

As children become older it is more beneficial that the visual and physical clues be reduced in favor of clues which are related directly to the language usage itself. A more refined linkage system may be advantageously used with the older group of students. I provide a linkage system which includes a combination of pegs arranged in a geometrical pattern that fit holes in a complementary pattern in a block to be aligned and fitted therewith. The mathematical variety of patterns available provides linkages having great flexibility and variation for combinations of sentences available for construction as well as providing complex sentence structures and transformations. Coding features can be utilized to aid in recognizing verbs, nouns, tense changes, etc., but since the connecting features of the blocks do not depend on any external or visual code the use or nonuse of these visual or physical codes does not affect the working of the system, thus allowing greater flexibility in presenting language in varying approaches. Substitute labels can be supplied with the various codes and/or additional vocabulary.

To fully demonstrate the principles of the transformational grammar, various accessory and connecting pieces can be supplied enhancing the device's instructional value. Since language is basically logical, it is important to stress the logic of the basic patterns rather than the exceptions to the rules. Children learn the natural language of their environment by imitating and building upon vocal patterns rather than by formal grammatical format. It is this understanding that my device reproduces visually so that children with language difficulties, particularly deaf children, can be taught in an analogous fashion. By reducing the complex rules of grammar to a tangible, physically manipulative system, the user will find it more enjoyable to learn the language. Of course, play value exists both in the inherent requirement of choosing the correct blocks as well as various games that can be constructed to aid in teaching grammatical rules. The value of self discovery and self correction is considered to be of the highest in education; with my invention both of these features exist and an instructor is not necessary for the blocks to be used correctly. The child discovers for himself language patterns and concepts.

Other advantages of my invention will become obvious from a perusal of the following detailed specification of presently preferred embodiments of my invention taken in connection with the following drawings of which:

FIG. 7 is an end view of block illustrating one type of coding for the creation of a peg linkage system; and FIGS. 8–17 are illustrative of one possible code usage using the code pattern of FIG. 7.

Figure 1:
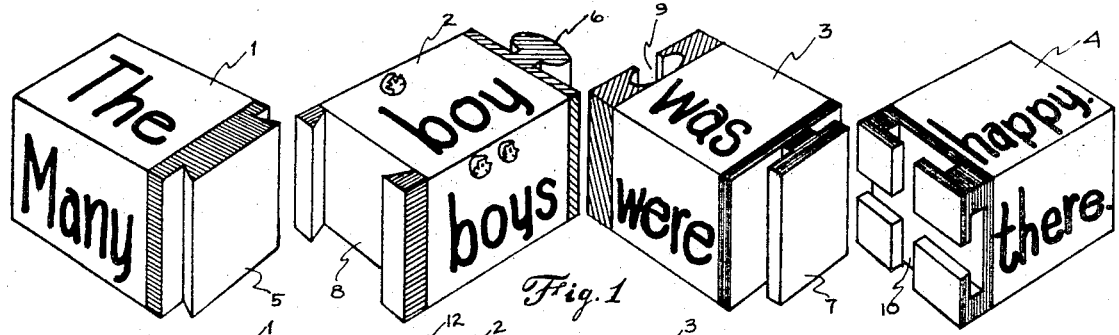
FIG. 1 is a perspective view of one embodiment in which the blocks include interlocking complementary linkages.

Referring to FIG. 1, I have shown a number of blocks which are particularly useful to younger users. Blocks 1–4 are illustrative of one embodiment on which each of the four sides contain a word which falls into a generic classification. For example, block 2 carries various nouns or pronouns. Block 3 for example, is provided with a transitive or intransitive verb with appropriate tense changes. Other blocks are provided with adverbs, adjectives, etc. and may include appropriate morphological ending on each side. The ends of each of the blocks is provided with a shaped projection 5–7 which is adapted to interlock or fit a complementarily shaped receiving groove 8–10 respectively. As shown in FIG. 1, blocks 1 through 4 include both plural and single function words which are simultaneously combined to form two grammatically correct word combinations. Block 3 includes a projection 7 which is preferably shaped to interlock with a block 4 having words which are combinable in either function. Block 4, therefore, is an opening or receiving groove 10 which is interlockable with block 3 in 90° rotational modes. This is distinguished from blocks 2 and 3 having projection 6 and groove 9, respectively, which are interlockable only in 180° rotational mode.

The projection and complementarily receiving grooves are unique. For example, projections 6 of block 2 is designed to interlock with groove 9 of block 3 to provide a noun-verb combination. The noun and verb can only be connected in this fashion and an adverb could not be connected in front of the noun to make an improper combination. Furthermore, the noun and verb persons are proper because the projection will interlock with the receptacle to form only a proper combination. While it is possible to construct with these linkages a sentence, for example, which is in the singular or the plural person, it is not possible to align a noun of the singular person with a verb of a plural person. Accordingly, the child or student is capable of constructing a sentence which is grammatically correct without further aid from a teacher or any artificial code.

Figure 2:
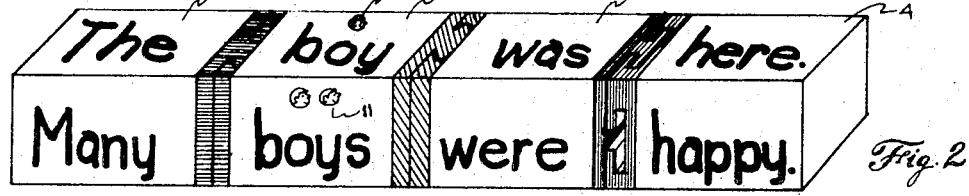
FIG. 2 is a view of the blocks interlocked to form a sentence.
Figure 3:
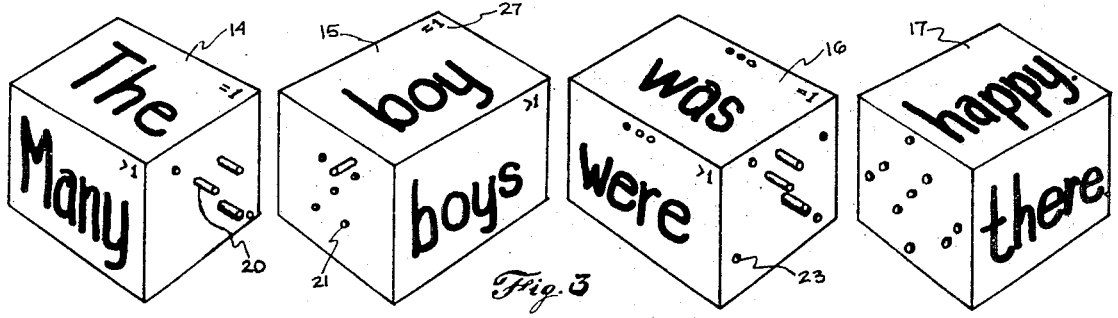
FIGS. 3 and 4 are perspective views of another embodiment in which pegs are utilized to form the linkage.

In FIG. 2, blocks 1–4 are interlocked to form a complete sentence on each of the four sides of the combination. To further aid in teaching, the ends of each of the blocks can be color coded to assist the child in interlocking the appropriate projection-groove. Also, it is possible to help the child understood the plural and singular forms with the aid of picture 11 and 12 respectively.

Another embodiment of my invention is shown in FIGS. 3–6 in which the blocks include pegs 20 arranged in geometrical patterns to interlock in hole 21 of a complementary or similar pattern. Utilizing a geometrical pattern system provides a very large number of possible variations. To increase the flexibility of the system and to eliminate possible errors, a "no-go" peg 22 can be incorporated on the receiving end and complementary receiving holes 23 in the projecting end as in FIGS. 3 and 6. With this arrangement, blocks 36 and 38 cannot be assembled to form the improper combination "I is," since no-go peg 22 of block 38 is not provided with a receiving hole in that position on block 36.

Figures 4, 5:
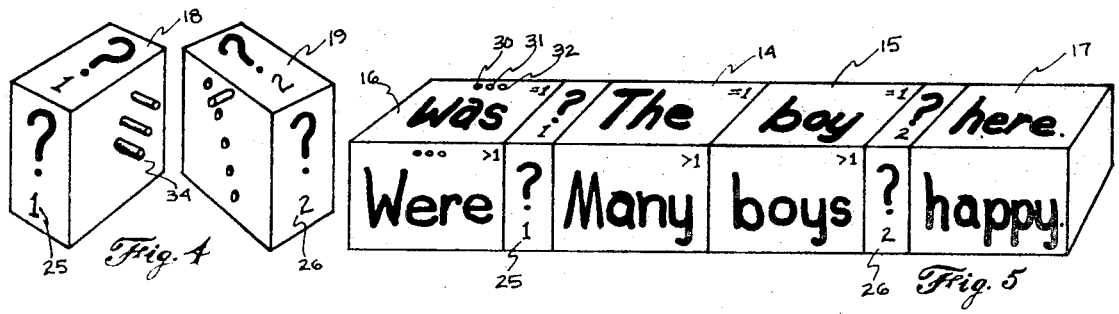
FIG. 5 is the embodiment shown in FIG. 3 connected to form a sentence utilizing the interrogatory marks of FIG. 4.
Figure 6:
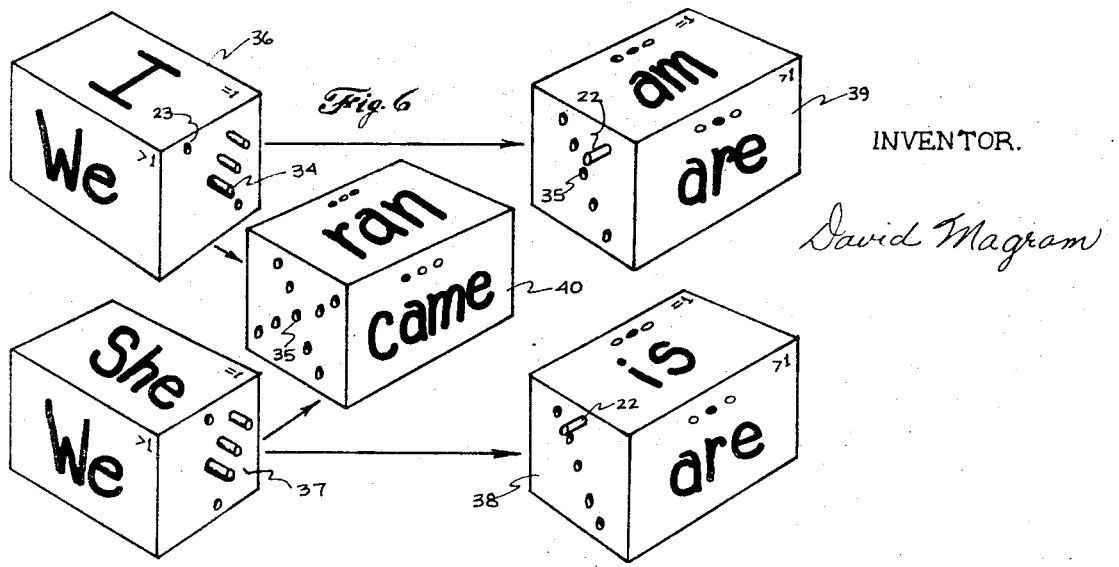
FIG. 6 is a block flow pattern illustrative of the possible arrangements incorporating peg linkages and demonstrating the "no-go" pegs.

It is also possible with this embodiment to include various teaching aids. For example, FIG. 4 shows an interrogatory mark which can be inserted in sentences or after words which indicate a question is being asked by transforming the sentence structure. Also the use of symbols 27 and 28 can aid in teaching the number of persons. This is used to great advantage on blocks 14–17 either in the form of numbers or as symbols 27 and 28. An equal sign 27 indicates the singular, and (greater than) 28 indicates the plural.

A further aid can be included on the verbs. For example, circles 30–32 on block 16 represent the past, present, and future tense of the verb respectively. To indicate the tense, one of the circles is filled in as shown on block 16, 30 is filled in indicating the past tense.

As an aid to the assembly of the blocks, especially for younger children, the center peg is preferably larger in size and/or longer in length than the other pegs. I have found that is is preferable to include in all geometrical patterns a center peg 34 and corresponding receiving hole 35. Even if not larger in size, it facilitates the assemblage of the blocks.

The system set out in this embodiment is particularly useful as the child grows older, since dependency upon visual shapes and colored linkage combinations is reduced. Dependency upon language recognition itself is more important and thus should be stressed.

FIGS. 7 through 17 is a nonlimiting example of one particular geometrical system utilizing a form quadrant coding system. FIG. 7 shows the quadrants I – IV in which letters a-e designate either complementary holes or pegs. FIGS. 8–17 illustrate a number of word forms which can be used. Each vertical array represents four sides of a block. As shown, the letters at the top of each array designates the peg location on the right side of the array and hole designation on the left side. The letter set out in parenthesis designates the location of the no-go peg and the complementary receiving hole therefor. Thus by taking for example a block having pegs BE–AC(D) it can be combined with a block having AC(D)–BD(E) which in turn can be combined with a block BD(E)–BD(D), etc. to form a sentence. The rectangles 41 of FIGS. 9–7 represent the projections or pegs on the indicated blocks that permit only a 180° rotation of the blocks so marked. The shaded rectangle indicates a male connection while the unshaded rectangle represents a female connection. It is thus clear, that by taking blocks having the same peg code and combining it with a block having the same hole code, grammatically correct sentences can be formed.

While I have shown and described presently preferred embodiments of my invention, it may otherwise be embodied within the scope of the appended claims.

I claim:

1. An education device comprising a plurality of three dimensional blocks adapted to be interlocked together to form at least two grammatically correct word combinations, one of said combinations being in the singular and the other of said combinations being in the plural, each of said blocks including on each of its sides at least one word of the same grammatical classification and having ends adapted for interlocking, one of said ends including at least one projection unique to the grammatical classification associated with said block and said other end including at least one opening unique to said associated classification, said opening having a configuration which receives only a projection which forms a grammatically correct word combination.

2. A device as set forth in claim 1 including blocks having on each of its sides at least one word of the same grammatical classification associated with both plural and singular word combinations, said blocks having only one of its ends adapted to interlock.

3. A device as set forth in claim 1 wherein said projections comprise a plurality of pegs and said openings comprise a plurality of holes for receiving said pegs, each block having a unique number and arrangement of said pegs and holes associated with a grammatical word classification.

4. A device as set forth in claim 1 wherein the end having said receiving opening includes a second projection and said projection end includes a second opening to receive said second projection to limit the number of interlocking combinations between two grammatically correct block combinations.

5. A device as set forth in claim 3 wherein said pegs are arranged in a geometrical pattern and said openings include geometrical patterns complementary to the pattern of a grammatically correct block.

* * * * *

UNITED STATES PATENT OFFICE
CERTIFICATE OF CORRECTION

Patent No. 3,728,800         Dated April 24, 1975

Inventor(s)  David Magram

It is certified that error appears in the above-identified patent and that said Letters Patent are hereby corrected as shown below:

On the Cover Sheet, in item [76] "2304 Sherwood St." should read -- 2304 Sherbrook Street --.

Signed and sealed this 1st day of April 1975.

(SEAL)
Attest:

RUTH C. MASON
Attesting Officer

C. MARSHALL DANN
Commissioner of Patents
and Trademarks